455-608 AU 263 EX
E4819 OR 3,400,218
Examiner
365-451

Sept. 3, 1968 H. C. SIBLEY 3,400,218

LINE CIRCUIT FOR CODE COMMUNICATION SYSTEMS WITH PHOTORESISTIVE PULSE PRODUCER

Filed May 6, 1964 2 Sheets-Sheet 1

INVENTOR.
H.C. SIBLEY
BY
HIS ATTORNEY

INVENTOR.
H.C. SIBLEY
BY Forest B. Hitchcock
HIS ATTORNEY

United States Patent Office 3,400,218

Patented Sept. 3, 1968

3,400,218
LINE CIRCUIT FOR CODE COMMUNICATION SYSTEMS WITH PHOTORESISTIVE PULSE PRODUCER

Henry C. Sibley, Spencerport, N.Y., assignor to General Signal Corporation, a corporation of New York Filed May 6, 1964, Ser. No. 365,451
6 Claims. (Cl. 179—2)

ABSTRACT OF THE DISCLOSURE

A communication system is shown having pulses of opposite polarity applied through photo-resistors connected in a bridge and in series with a direct current source of energy. The polarity of the pulses is determined by the selective illumination of such photo-resistors. Another photo-resistor is connected in shunt across the line circuit both for reducing inductive energies stored therein and for cooperating with said other photo-resistors to produce pulses of uniform shape and having characteristics ineffective to produce unwanted transients in a telephone system also connected to the same line wires. The photo-resistor in shunt across the line circuit is illuminated between successive illuminations of the other photo-resistors.

*Background of the invention*

Figure 1A:
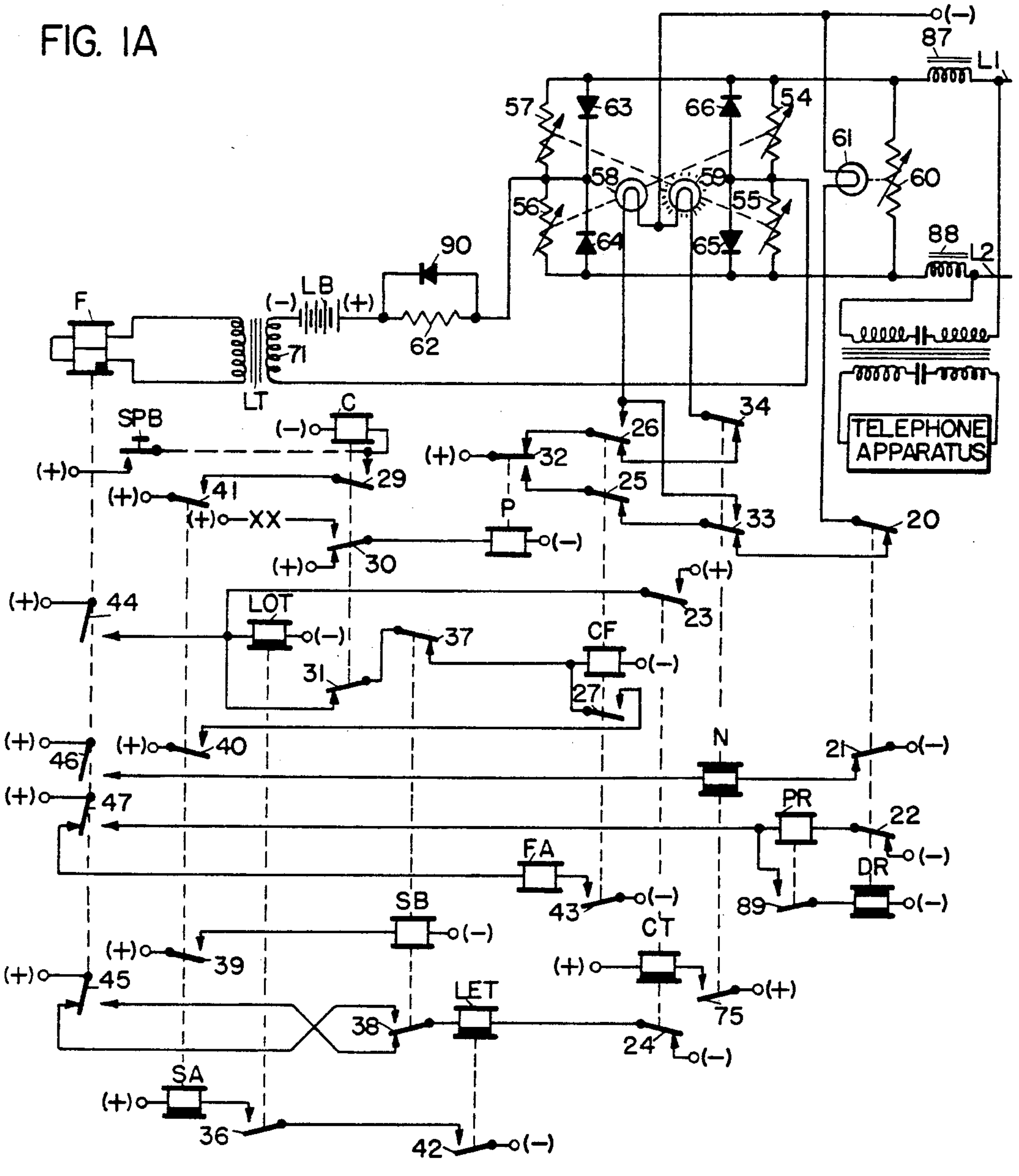

This invention relates to code communication systems, and it more particularly pertains to means for applying pulses to the line circuit in such systems.

One problem in the keying of line circuits for code communication systems for transmitting both direct current pulses and voice and carrier frequencies is the presence of harmonics in the voice and carrier channels due to poor wave shaping which is caused by the abrupt operation and/or bounce of direct current coding contacts when a code is transmitted.

Another problem in line circuits for code communication systems is to insure the quick response of line relays at various field stations remote from the control office to line circuit conditions of energization and deenergization transmitted from the control office, particularly where relatively long line and/or cable circuits are involved.

*Summary of the invention*

The system according to the present invention provides improved wave shaping for pulses transmitted from a control office over a communication channel to a plurality of field stations. This is accomplished by the use jointly of series and shunt connected photo-resistors in the line circuit at the transmitting station to control direct pulsing of a shunt type line circuit that can also be used for telephone communication. The series photo-resistors are controlled in a bridge circuit arrangement to selectively transmit pulses of either polarity from a line battery, and the shunt photo-resistor is used to more abruptly terminate each pulse generated by the series photo-resistors than is normally effective in accordance with the control of the series photo-resistors upon deenergization of their associated control lamps. In this manner, the shaping of pulses transmitted is improved by the leading edge of the pulse being substantially sinusoidal as compared to the sharp leading edge that is normally applied by a coding relay contact. The termination of the pulse is a wave shape which tapers off in accordance with the cooling time of the controlling lamp, which time is decreased as has been described by the shunt photo-resistor, thus providing the desired wave shaping to provide for relatively fast pulsing while producing a minimum amount of line disturbance. The photo-resistors are protected against line circuits by a bridge system of shunting diodes.

Transmission from each of the field stations is accomplished by selectively applying a shunt across the line circuit by the control of a photo-resistor.

An object of the present invention is to employ photosensitive resistors to apply coded direct current pulses to the line wires of a code communication system.

Another object of the present invention is to employ photosentitive resistors to control the wave shape and amplitude of coded direct current pulses on the line wires of a code communication system.

Other objects, purposes and characteristics features of the present invention will be in part obvious from the accompanying drawings, and in part pointed out as the description of the invention progresses.

Figure 1B:
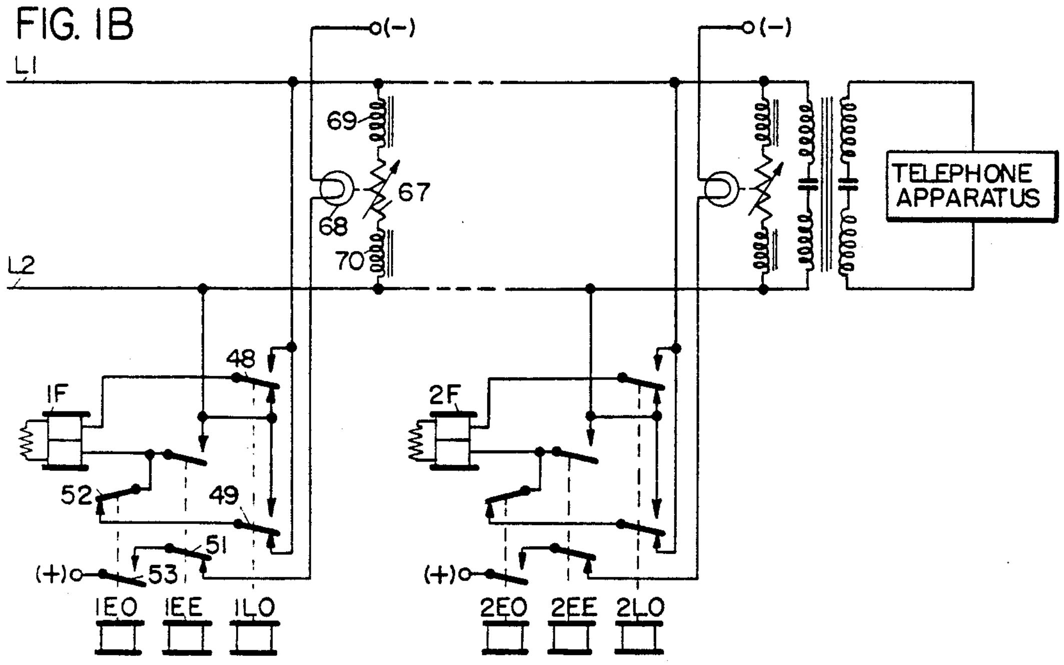
Figure 2:

In describing the invention in detail, reference is made to the accompanying drawings in which similar parts are identified by similar like reference characters and in which:

FIGS. 1A and 1B when placed side by side illustrate a line circuit organization for one embodiment of the present invention; and FIG. 2 illustrates the shape of a line circuit pulse transmitted by the line circuit apparatus of FIGS. 1A and 1B.

For the purposes of simplifying the illustration and facilitating the explanation thereof, the various parts and circuits constituting this embodiment of the present invention have been shown diagrammatically and certain conventional illustrations have been employed, the drawings have been made more with the purpose of facilitating the disclosure of the present invention as to its principles and mode of operation than for the purpose of illustrating the specific construction and arrangement of parts that would be employed in practice. The symbols (+) and (−) are used to indicate connections to the respective positive and negative terminals of a suitable direct current source.

With reference to FIGS. 1A and 1B, line wires L1 and L2 are provided to connect communication apparatus at a control office to communication apparatus at a plurality of remotely spaced field stations. Opposite ends of the line wires can be coupled by tranformers to telephone apparatus as is illustrated in the drawings. To prevent direct current shorting of the line circuit through the windings of the transformers, suitable condensers are connected in series with the windings of the transformers. To prevent shorting of the line wires through the line battery at the higher voice and carrier frequencies, suitable chokes 87 and 88 are also inserted in the line wires.

Photosensitive resistors 54, 55, 56, 57 and 60 (see FIG. 1A) are provided at the control office. The photosensitive resistors 54, 55, 56 and 57, which are arranged in a bridge circuit configuration, connect the line wires in series with the direct current source. Another photosensitive resistor 60 is shunted across the two line wires L1 and L2. Light source consisting of suitable incandescent lamps are provided for optically controlling the photosensitive resistors. A photosensitive resistor and a corresponding incandescent lamp light source are also provided at each field station.

Relays P and N are provided at the control office to energize and deenergize the incandescent lamps which control the resistance condition of the photosensitive resistors. Relays EE and EO are provided at each field station to perform the same function.

Relays C and CF are provided at the control office for initiating control cycles and indication cycles, respectively.

Relays LOT and LET are provided at the control office as odd and even digit timer relays for timing the duration of selected "ON" and "OFF" periods of the line circuit. Relays CT and DR are provided at the control office to provide continuous operation of relays LOT and LET during the operation of pulsing relays P and N.

Relay SA is provided at the control office as a clear-out relay.

Additional code communication apparatus is provided for the selection of the codes to be transmitted, for the stepping, and for decoding and registration purposes in accordance with the usual practice for code communication systems of this type. This apparatus can be provided, for example, as is disclosed in the U.S. Patent No. 2,399,734 of Hailes et al. dated May 7, 1946.

Having thus described the general organization of the system according to the present invention, more detailed consideration will be given as to the circuit organization when considering typical condition of the operation of the system.

*Operation*

The code communication system to which this embodiment of the present invention is assumed to be applied is of the type that is normally at rest and subject to initiation from either the control office or any of the field stations into respective control and indication cycles of operation. When the system is not in an operating cycle, it is assumed to be at rest, and the condition of the relays illustrated in the drawings is the condition that these relays assume when the system is at rest. It is to be understood, however, that the system according to the present invention can be applied to other communication systems that are continuously operating, and it is also to be understood that the method of transmission according to the present invention can be used where transmission is partially by hand, as by the manual operation of a key to select the character of the pulses transmitted.

The line circuit is energized at this time with the (+) terminal of the line battery LB connected to the line wires L1 and the (−) terminal of the line battery connected to the line wire L2. For consideration of different conditions of the line circuit, this condition will be assumed as a condition providing a positive polarity of energization of the line circuit.

To consider the mode of operation during a control cycle, it will be assumed that a control is designated at the control office as by the actuation of start push button SPB for transmission and that the relay C is picked up in accordance with such designation. The picking up of relay C opens up the circuit for maintaining transmitter relay P energized through back contact 30 of relay C, and transfers control of relay P to the code communication apparatus. At the same time, relay CF is prevented from being energized by the opening of back contact 31 of relay C.

A conditioning period now occurs during which time lamp 59, which was energized through front contact 32 of relay P, back contact 26 of relay CF, and back contact 34 of relay N, is deenergized by the opening of front contact 32 of relay P when back contact 30 of relay C is opened to drop relay P. The deenergization of lamp 59 results in the increase to maximum resistance of photosensitive resistors 55 and 57 such that voltage from the line battery LB is effectively removed from the line wires L1 and L2. As a result of the removal of voltage from the line wires L1 and L2, a decrease of current through the primary winding 71 of impulse transformer LT occurs. This decrease in current in the impulse transformer LT energizes the line relay F at the control office with a polarity to actuate its contacts to their right-hand positions, and thus close pick up circuits for energizing relays LET, LOT, N and DR. Upon the picking up of relays LOT and LET, their respective front contacts 36 and 42 close an energizing circuit for relay SA. The picking up of relay SA closes a stick circuit for relay C including front contact 41 of relay SA and front contact 20 of relay C. This maintains relay C picked up so that the transmitter relay P can continue to be controlled from encoding apparatus (indicated by XX) through front contact 30 of relay C. The picking up of relay SA, upon the closure of its front contact 39, also causes relay SB to switch the path for energizing relay LET from back contact 38 to front contact 38 of relay SB so that relay LET is deenergized and commences to time out the balance of the conditioning period.

During the time delay in pick up of slow acting relay N after the contacts of line relay F operate to the right-hand position, lamp 61 is energized through back contact 32 of relay P, back contact 25 of relay CF, back contact 33 of relay N, and back contact 20 of relay DR. While lamp 61 is so energized, photosensitive resistor 60 is in its minimum resistance condition, thus effectively placing a D.C. shunt between line wires L1 and L2. This shunt terminates the pulse that has been transmitted more abruptly than would be effective if termination were dependent only upon the rate of cooling of the incandescent lamps associated with the series photo-resistors. This is illustrated in FIG. 2 wherein it is illustrated that the trailing edge of a transmitted pulse would take the form of the dotted line 91, were it not for the action of the shunt photo-resistor 60. When relay N picks up to open back contact 33 of relay N, lamp 61 is deenergized, and photosensitive resistor 60 again assumes its maximum resistance condition to effectively remove the D.C. shunt between line wires L1 and L2. Also, when relay N picks up, the circuit through back contact 32 of relay P, back contact 25 of relay CF, and front contact 33 of relay N, is closed to energize lamp 58 and cause photosensitive resistors 54 and 56 to assumed their minimum resistance conditions thereby effectively connecting voltage of negative polarity to the line wires.

The energization of the line circuit with negative polarity results in current flow through primary winding 71 of impulse transformer LT which causes line relay F to be energized and operate its contacts to their left-hand positions. This operation of relay F opens the circuit for relay N and causes relay N to drop out after a time delay and interrupt the circuit through front contact 33 of relay N for energizing lamp 58. When lamp 58 is deenergized, photosensitive resistors 54 and 56 return to their maximum resistance conditions and thus terminate the negative energization of the line wires L1 and L2. Termination of the negative pulse in the line circuit decreases the current through impulse transformer LT and causes line relay F to be energized and operate its contacts to their right-hand positions.

During the time relay N was picked up to maintain front contact 75 of relay N closed and thereby energize relay CT, front contact 23 of relay CT was closed and back contact 24 of relay CT was opened to maintain relays LOT and LET energized and deenergized respectively. In this manner, relays LOT and LET are not interrupted during their digit timing function while relay N is picked up and dropped out and contacts 44 and 45 of relay F are correspondingly operated to their left-hand and then right-hand positions.

When contact 47 of line relay F is operated to its right-hand position at the start of a conditioning period, relay PR is picked up through contact 47 of relay F and back contact 22 of relay DR. This in turn provides a pick up circuit through front contact 89 of relay PR for relay DR. The pick up characteristic of relay DR is such that it will pick up to open back contacts 20, 21 and 22 of relay DR at the same time relay N picks up. The drop out characteristic of relay DR, however, is slower than that of relay N so that relay DR will not drop out until after delayed dropout relay LET has dropped away and caused code transmitted P to be picked up to initiate transmission of the first character of code to be transmitted. Thus, although relay N has dropped away to close back contact 33 of relay N, a shunt will not again be placed across line wires L1 and L2 due to energization of lamp 61 through the circuit including back contact 33 of relay N, since back contact 20 of relay DR, also in this circuit, is now open. Also, relay N cannot again pick up through contact 46 of relay F and back contact 21 of relay DR, since back contact 21 of relay DR is now open. Relay DR will remain energized and therefore back contacts 20 and 21 of relay DR will remain open, as long as contact 47 of relay F is in its right-hand position to maintain the circuit for energization of relay DR closed.

Upon the dropping away of delayed dropout relay LET, code transmitter P is picked up to initiate transmission of the first character of the code to be transmitted. This operation also terminates the conditioning period. Picking up of relay P provides a circuit for the energizing of lamp 59 through front contact 32 of relay P, back contact 26 of relay CF, and back contact 34 of relay N to cause photosensitive resistors 55 and 57 to assume their minimum resistance condition and thus effectively energize the line wires L1 and L2 with a positive polarity from the line battery LB. This energization results in current flow through the primary winding of impulse transformer LT so that relay F is energized and operates its contacts to their left-hand positions. The operating of contact 44 of relay F to its left-hand position deenergizes relay LOT so that the slow drop away characteristic of relay LOT is now utilized to time the application of positive voltage to that line wires. Operation of contact 45 of relay F to its left-hand position causes relay LET to be energized so that it is set up to time the following even digit of the coded character. Operation of contact 47 of relay F to its left-hand position deenergizes relay DR so that back contacts 20 and 21 of relay DR are positioned to allow shunting and application of negative energization to the line wires L1 and L2 during the next even digit.

Upon the dropping away of relay LOT, transmitter relay P deenergized to switch contact 32 of relay P from its front to its back position to initiate the next even digit. The circuit then proceeds to operate during the application of the even digit pulse to the line wires in the manner previously described during the conditioning period.

Having thus described the mode of operation involved in the control of the pulsing circuit during transmission of first typical odd and even code characters, it will be readily apparent that a similar mode of operation is effective for each of the other code characters transmitted during a control cycle.

Upon termination of the last step of the control cycle, relay LET drops out. However, transmitter P is not picked up to initiate the sequence of steps necessary to cause line relay F to operate its contacts to their right-hand positions. Relay LET is therefore not energized through contact 45 of relay F so that front contact 42 of relay LET remains opened a period longer than the delayed dropout time of relay SA. As a result, relay SA drops out to deenergize relays SB and C which were held picked up through front contacts 39 and 41 respectively of relay SA. When relay C drops away, relay P is energized through back contact 30 of relay C to energize lamp 59 through front contact 32 of relay P, back contact 26 of relay CF, and back contact 34 of relay N. Illumination from energized lamp 59 causes photosensitive resistors 55 and 57 to assume their minimum resistance condition and thereby connect positive voltage from line battery LB to line wires L1 and L2. Current will now again flow through impulse transformer LT so that line relay F is energized and operates its contacts to their left-hand positions. The circuit is now in the condition which has been described as normally at rest.

During an indication cycle of operation, transmission is from a field station or stations initiating the cycle by the selective shunting of the line wires L1 and L2. A conditioning period at the beginning of an indication cycle from field station No. 1 is initated by the picking up of relay 1EO. Contacts 48 and 49 of relay 1LO are switched from their back position to their front position upon the operating of relay 1LO which is energized in response to the picking up of relay 1EO. The closing of front contacts 48 and 49 of relay 1LO pole changes field line relay 1F. At the same time, lamp 68 is energized through front contact 53 of relay 1EO to cause photosensitive resistor 67 to assumed its minimum resistance condition and thus shunt line wires L1 and L2.

The shunting of line wires L1 and L2 increases the current flow through a circuit including line battery LB, limiting resistor 62, photosensitive resistor 57, inductance 87, inductance 69, photosensitive resistor 67, inductance 70, photosensitive resistor 55, inductance 88, and primary winding 71 of impulse transformer LT. The increased current flow through impulse transformer LT causes offices line relay F to be energized and operate its contacts to their right-hand positions. The closing of contacts 44 and 45 of relay F in their right-hand positions results in the energization of relays LOT, LET and SA in the manner previously described. Also, closing of contact 44 of relay F in its right-hand position closes a circuit through contact 44 of relay F, back contact 31 of relay C, and back contact 37 of relay SB for the energization of relay CF which will thereafter maintain itself picked up through its own front contact 27 as long as front contact 40 of relay SA is closed. The pickup circuit for relay CF is opened when relay SB is picked up to open its back contact 37 to prevent relay CF from being energized through contact 44 of relay F when the indication cycle is terminated and clear out relay SA drops away.

Energizing of relay CF also causes it to close front contact 43 of relay CF to thereby set up the circuit through which relay FA is energized each time contact 47 of relay F is operated to its left-hand position. In addition, picking up of relay CF switches contact 26 of relay CF from its back position to its front position so that the circuit for energizing lamp 59 is opened and the circuit for energizing lamp 58 is closed. Deenergizing lamp 59 removes positive energization from the line wires L1 and L2. Energizing lamp 58 causes the resistance condition of photosensitive resistors 54 and 56 to assume their minimum conditions so that the line wires L1 and L2 now become energized with a negative polarity.

The picking up of relay 1EE at field station No. 1 terminates the indication cycle conditioning period and removes the shunt from the line wires L1 and L2 by opening back contact 51 of relay 1EE to deenergize lamp 68 and cause photosensitive resistor 67 to assume its maximum resistance condition. The picking up of relay 1EE also causes relay 1EO to be dropped away so that a circuit for energizing relay 1F is provided through back contact 52 of relay 1EO.

The removal of the shunt from line wires L1 and L2 results in an increase in current through the circuit including primary winding 71 of impulse transformer LT at the control office. The increase of current through impulse transformer LT causes office line relay F to be energized and operate its contacts to their left-hand positions. The picking up of relay FA through contact 47 of relay F in its left-hand position is effective to register the first indication cycle "non-shunt" period with the station office code receiving relays. Upon the termination of the first "non-shunt" period, relay 1EE is dropped out and relay 1EO is picked up to close front contact 53 and open back contact 52 of relay 1EO to, respectively, cause shunting of the line wires and remove relay 1F from the line. Shunting of the line wires results in an increase of current through impulse transformer LT to cause office line relay F to operate its contacts to their right-hand positions. The dropping out of relay FA due to the operation of contact 47 of relay F from its left-hand to its right-hand position is effective to register the first indication cycle "shunt" period with the station office code receiving relays. The "shunt" and "non-shunt" periods are made selectively long or short in accordance with the code characters to be transmitted.

Having thus described the mode of operation involved in the control of the line circuit during the first step of an indication cycle, it will be readily apparent that a similar mode of operation is effective for each of the other steps of an indication cycle.

Upon termination of the last step of an indication cycle, at field station No. 1, the relay 1EO, 1EE and 1LO are returned to their normally deenergized conditions and the line relay 1F is restored to its normal position.

The sequence of steps at the control office necessary to terminate an indication cycle and return the system to its normal at rest condition, is initiated when relay SA is deenergized and its front contacts 39 and 40 are opened. Opening front contact 39 of relay SA deenergizes relay SB so that contact 38 of relay SB is switched from its front to its back position and back contact 37 of relay SB is opened to return the circuits for the pick up of relays LOT and CF respectively to their normal at rest conditions. Opening of the circuit through front contact 40 of relay SA for maintaining relay CF energized, switches contact 26 of relay CF from its front to its back position, thereby deenergizing lamp 58 and energizing lamp 59 such that negative energization is removed from the line wires L1 and L2 and the line circuit is restored to its normal condition. Deenergizing of relay CF also opens front contact 42 of relay CF to drop out relay FA.

Rectifiers 63, 64, 65 and 66 come into operation only in the event of a high voltage surge on either line wire L1 or L2. The rectifiers offer the path of least resistance to a voltage surge occurring on the line wires and are effective to discharge such a surge around the photosensitive resistors through diode 90, which shunts resistor 62, and through the line battery LB.

Having thus described a line circuit control system of a centralized traffic control system as one embodiment of the present invention, it is desired to be understood that various modifications, adaptations and alternations may be made to the specific form shown within the scope of the present invention as limited by the appended claims.

What I claim is:

1. In a code communication system for transmitting code pulses from a transmitting station to a remote receiving station, a line circuit having a pair of line wires connecting the transmitting and receiving stations, a source of energy at the transmitting station for energizing the line wires, said line circuit having at least one photo-resistor connected in series with said source of energy in the line circuit, said line circuit having another photo-resistor shunted across the line wires, separate sources of illumination for the series and shunt photo-resistors respectively effective when energized to illuminate their associated photo-resistors, and transmitting means at the transmitting station for alternately energizing said sources of illumination for the transmission of code pulses over the line wires.

2. The invention according to claim 1 wherein said source of energy is connected in the line circuit in series through a bridge circuit comprising a plurality of photo-resistors.

3. The invention according to claim 2 wherein the photo-resistors of said bridge circuit are protected against damage from line surges by a bridge of unidirectional devices connected in multiple with said photo-resistor bridge.

4. The invention according to claim 2 wherein said transmitting means selectively energizes the sources of illumination for said photo-resistors of said bridge circuit to thereby selectively energize said line circuit with pulses of positive and negative polarity, and said transmitting means energizes the source of illumination for said shunt photo-resistor between the energizations of said sources of illumination for said bridge circuit photo-resistors.

5. In a code communication system for transmitting code pulses from a transmitting station at an intermediate point in a line circuit to a remote receiving station, said line circuit having a pair of line wires extending at least between the transmitting and receiving stations and also having telephone apparatus coupled thereto, a source of energy connected to said line wires at one end of the line circuit, a photo-resistor shunted across the line wires at the transmitting station, said photo-resistor normally being non-conductive but becoming conductive when receiving illumination, a source of illumination for said photo-resistor effective when energized to illuminate said photo-resistor, and means at the transmitting station for selectively energizing said source of illumination to thereby generate shunt and non-shunt pulses selectively in said line circuit, which pulses comprise substantially only harmonics below voice and carrier frequencies.

6. In a code communication system for transmitting code pulses from a transmitting station to a remote receiving station, a line circuit having a pair of line wires connecting the transmitting and receiving stations, a source of energy at the transmitting station for energizing said line circuit, said line circuit having a plurality of photo-resistors connected in the form of a bridge for connecting said source of energy to said line wires, a plurality of sources of illumination for the photo-resistors effective when energized to illuminate the associated photo-resistors and render them conductive, a plurality of unidirectional devices connected to a form of bridge circuit connected in multiple with said photo-resistor bridge to prevent the flow of energy from said source through said unidirectional devices but to allow the flow of other energy on said line wires through said unidirectional devices, and means for selectively energizing said sources of illumination for applying pulses of selected polarities to said line circuit.

References Cited

UNITED STATES PATENTS

| | | | |
|---|---|---|---|
| 2,342,245 | 2/1944 | Bruce et al. | 250—210 X |
| 2,584,800 | 2/1952 | Grisdale | 317—16 X |
| 3,014,135 | 12/1961 | Hewlett et al. | 332—3 X |

ROBERT L. GRIFFIN, *Primary Examiner.*

J. T. STRATMAN, *Assistant Examiner.*